US012739834B2

(12) United States Patent
Zhang et al.

(10) Patent No.: US 12,739,834 B2
(45) Date of Patent: Sep. 15, 2026

(54) TRANSMISSION METHOD FOR PHYSICAL UPLINK CONTROL CHANNEL, TERMINAL, AND BASE STATION

(71) Applicants: China Mobile Communication Co., Ltd Research Institute, Beijing (CN); China Mobile Communications Group Co.,Ltd., Beijing (CN)

(72) Inventors: Yi Zhang, Beijing (CN); Liang Xia, Beijing (CN); Dan Wu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 502 days.

(21) Appl. No.: 18/040,017

(22) PCT Filed: Aug. 6, 2021

(86) PCT No.: PCT/CN2021/111216
§ 371 (c)(1),
(2) Date: Jan. 31, 2023

(87) PCT Pub. No.: WO2022/028581
PCT Pub. Date: Feb. 10, 2022

(65) Prior Publication Data

US 2023/0300840 A1 Sep. 21, 2023

(30) Foreign Application Priority Data

Aug. 7, 2020 (CN) ......................... 202010790995.1

(51) Int. Cl.
*H04W 72/21* (2023.01)
*H04L 5/00* (2006.01)
*H04W 72/563* (2023.01)

(52) U.S. Cl.
CPC ......... *H04W 72/21* (2023.01); *H04W 72/563* (2023.01); *H04L 5/0053* (2013.01); *H04L 5/0055* (2013.01)

(58) Field of Classification Search
None
See application file for complete search history.

(56) References Cited

U.S. PATENT DOCUMENTS 12,279,296 B2 * 4/2025 Lee ....................... H04L 5/0094
2006/0203765 A1 9/2006 Laroia et al.
(Continued)

FOREIGN PATENT DOCUMENTS

CN 109392169 A 2/2019
CN 111314033 A 6/2020
(Continued)

OTHER PUBLICATIONS

Huawei, HiSilicon, UCI enhancements for URLLC, 3GPP TSG RAN WG1 Meeting #95, R1-1812222, Nov. 12-16, 2018, Spokane, USA.
(Continued)

*Primary Examiner* — Marcus Smith
*Assistant Examiner* — Rowan K Fakhro
(74) *Attorney, Agent, or Firm* — Price Heneveld LLP

(57) ABSTRACT

A transmission method for physical uplink control channel (PUCCH), a terminal and a base station are provided. The method includes: if a terminal determines or would transmit at least two PUCCHs which are overlapped, the at least two PUCCHs including a first PUCCH and a second PUCCH, the first PUCCH having a first priority index and carrying or corresponding to a first uplink control information (UCI), the second PUCCH having a second priority index and carrying or corresponding to a second UCI, transmitting, by the terminal, the first UCI and the second UCI in a third
(Continued)

PUCCH, wherein different code rates are used for the first UCI and the second UCI.

7 Claims, 4 Drawing Sheets

(56) References Cited

U.S. PATENT DOCUMENTS

2019/0261383 A1 8/2019 Kwak et al.
2020/0007296 A1* 1/2020 Papasakellariou .... H04L 1/1861
2020/0163081 A1 5/2020 Kim et al.
2021/0058919 A1 2/2021 Takeda et al.
2021/0321394 A1 10/2021 Li et al.
2022/0039088 A1* 2/2022 Zhang ................... H04W 72/21
2022/0078768 A1* 3/2022 El Hamss ............. H04L 5/0055
2022/0116952 A1* 4/2022 Lee ................... H04W 72/0446

FOREIGN PATENT DOCUMENTS

WO 2019130521 A1 7/2019
WO 2020033941 A1 2/2020
WO 2020135214 A1 7/2020
WO 2020146247 A2 7/2020

OTHER PUBLICATIONS

Huawei, Hisilicon, "UL intra-UE multiplexing between control channels", 3GPP TSG-RAN WG1 Meeting #97, R1-1907547, Reno, USA, May 13-17, 2019.

* cited by examiner

TRANSMISSION METHOD FOR PHYSICAL UPLINK CONTROL CHANNEL, TERMINAL, AND BASE STATION

CROSS-REFERENCE TO RELATED APPLICATION

The present application is the U.S. national phase of PCT Application No. PCT/CN2021/111216 filed on Aug. 6, 2021, which claims a priority to the Chinese patent application No. 202010790995.1 filed in China on Aug. 7, 2020, both of which are incorporated herein by reference in their entireties.

TECHNICAL FIELD

The present disclosure relates to the field of mobile communications technologies, in particular to a transmission method for physical uplink control channel (PUCCH), a terminal and a base station.

BACKGROUND

A physical uplink control channel (PUCCH) resource configuration method in the related art supports the following functions.

1) It is supported to configure the same terminal with two sets of hybrid automatic repeat request acknowledgement (HARQ-ACK) codebooks for enhanced mobile broadband (eMBB) and ultra-reliable and low latency communications (URLLC) simultaneously, so as to satisfy the latency and reliability requirements of eMBB and URLLC, where the two sets of HARQ-ACK codebooks may correspond to two sets of PUCCH configuration parameters, i.e., two PUCCH-Configs.

2) Each PUCCH-Config includes multiple PUCCH resource sets, and different PUCCH resource sets correspond to different respective uplink control information (UCI) payload sizes, respectively.

3) Each PUCCH resource set includes 8/32 PUCCH resources, and configuration information of each PUCCH resource includes a quantity of physical resource blocks (PRBs), a quantity of symbols, a format, a maxCodeRate, etc.

A PUCCH resource determination method in the related art is as follows.

1) The PUCCH resource may be used for transmission of UCI, where the UCI includes scheduling request (SR), HARQ-ACK and channel state information (CSI).

2) The PUCCH resource for transmission of UCI may be configured semi-statically, e.g., in the case of a PUCCH carrying an SR, a periodic CSI, or an HARQ-ACK for a semi-persistent scheduling (SPS) physical downlink shared channel (PDSCH). In addition, the PUCCH resource for transmission of UCI may be dynamically indicated by downlink control information (DCI) based on one semi-statically configured/pre-configured set, e.g., in the case of a PUCCH carrying an HARQ-ACK for a dynamic PDSCH.

2a) For the dynamically indicated PUCCH resource, the DCI scheduling the PDSCH includes PUCCH resource indicator (PRI) information of at most 3 bits, which is used for choosing one PUCCH resource from the multiple semi-statically configured/pre-configured PUCCH resources.

2b) after receiving the semi-static configuration and the downlink control information, the terminal firstly chooses one corresponding PUCCH resource set based on the UCI payload size, and then chooses, according to the PRI, one PUCCH resource from the chosen PUCCH resource set.

SUMMARY

At least one embodiment of the present disclosure provides a transmission method for physical uplink control channel, a terminal and a network device, which can improve system spectrum efficiency while satisfying requirements of different services.

According to one aspect of the present disclosure, at least one embodiment provides a transmission method for PUCCH, including:

if a terminal determines or would transmit at least two PUCCHs which are overlapped, the at least two PUCCHs including a first PUCCH and a second PUCCH, the first PUCCH having a first priority index and carrying or corresponding to a first uplink control information (UCI), the second PUCCH having a second priority index and carrying or corresponding to a second UCI, transmitting, by the terminal, the first UCI and the second UCI in a third PUCCH, wherein different code rates are used for the first UCI and the second UCI, respectively.

In addition, according to at least one embodiment of the present disclosure, the transmitting, by the terminal, the first UCI and the second UCI in the third PUCCH includes:

determining the third PUCCH according to a third downlink control information (DCI), wherein the third DCI is used for indicating transmission of the third PUCCH.

In addition, according to at least one embodiment of the present disclosure, the third PUCCH is one of at least one PUCCH resource configured by a third PUCCH configuration, and the PUCCH resource is configured by PUCCH resource configuration information, wherein, the third PUCCH configuration is a PUCCH configuration corresponding to the first priority index of the first PUCCH or the first UCI; or, the third PUCCH configuration is a PUCCH configuration corresponding to the second priority index of the second PUCCH or the second UCI; or, the third PUCCH configuration is a PUCCH configuration configured for transmission of the first UCI and the second UCI.

In addition, according to at least one embodiment of the present disclosure, PUCCH resource configuration information corresponding to the third PUCCH configures one maximum code rate (maxCodeRate); PUCCH resource configuration information corresponding to the first PUCCH configures at most one maxCodeRate; PUCCH resource configuration information corresponding to the second PUCCH configures at most one maxCodeRate.

In addition, according to at least one embodiment of the present disclosure, the method further includes:

determining that the code rate for the first UCI is a maxCodeRate configured by PUCCH resource configuration information corresponding to the third PUCCH, and determining that the code rate for the second UCI is a maxCodeRate configured by PUCCH resource configuration information corresponding to the second PUCCH;

or, determining that the code rate for the first UCI is a maxCodeRate configured by PUCCH resource configuration information corresponding to the first PUCCH, and determining that the code rate for the second UCI is a maxCodeRate configured by PUCCH resource configuration information corresponding to the third PUCCH.

In addition, according to at least one embodiment of the present disclosure, the method further includes:

determining that the code rate for the first UCI is a maxCodeRate configured by PUCCH resource configuration information corresponding to the third PUCCH, and determining the code rate for the second UCI according to the code rate for the first UCI;

or, determining that the code rate for the second UCI is a maxCodeRate configured by PUCCH resource configuration information corresponding to the third PUCCH, and determining the code rate for the first UCI according to the code rate for the second UCI.

In addition, according to at least one embodiment of the present disclosure, the method further includes:

determining that the code rate for the first UCI is a maxCodeRate configured by PUCCH resource configuration information corresponding to the third PUCCH, and if PUCCH resource configuration information corresponding to the second PUCCH configures a maxCodeRate, determining that the code rate for the second UCI is the maxCodeRate configured by the PUCCH resource configuration information corresponding to the second PUCCH, and if the PUCCH resource configuration information corresponding to the second PUCCH does not configure the maxCodeRate, determining the code rate for the second UCI according to the code rate for the first UCI;

or, determining that the code rate for the second UCI is a maxCodeRate configured by PUCCH resource configuration information corresponding to the third PUCCH, and if PUCCH resource configuration information corresponding to the first PUCCH configures a maxCodeRate, determining that the code rate for the first UCI is the maxCodeRate configured by the PUCCH resource configuration information corresponding to the first PUCCH, and if the PUCCH resource configuration information corresponding to the first PUCCH does not configure the maxCodeRate, determining the code rate for the first UCI according to the code rate for the second UCI.

In addition, according to at least one embodiment of the present disclosure, the determining the code rate for the second UCI according to the code rate for the first UCI or the determining the code rate for the first UCI according to the code rate for the second UCI includes:

determining that the code rate for the second UCI is the code rate for the first UCI plus a first adjustment factor, or the code rate for the first UCI minus the first adjustment factor, or the code rate for the first UCI multiplied by the first adjustment factor, or the code rate for the first UCI divided by the first adjustment factor;

or, determining that the code rate for the first UCI is the code rate for the second UCI plus a second adjustment factor, or the code rate for the second UCI minus the second adjustment factor, or the code rate for the second UCI multiplied by the second adjustment factor, or the code rate for the second UCI divided by the second adjustment factor.

In addition, according to at least one embodiment of the present disclosure, the first adjustment factor and/or the second adjustment factor is determined in one of following manners:

the first adjustment factor and/or the second adjustment factor is configured by a network through higher-layer signaling or is defined by a protocol;

or, the first adjustment factor and/or the second adjustment factor is determined from a set of numerical values according to a preset DCI, wherein the set of numerical values is configured by a network through higher-layer signaling or is defined by a protocol.

In addition, according to at least one embodiment of the present disclosure, PUCCH resource configuration information corresponding to the third PUCCH configures a first maxCodeRate and/or a second maxCodeRate.

In addition, according to at least one embodiment of the present disclosure, if the PUCCH resource configuration information corresponding to the third PUCCH configures the first maxCodeRate and the second maxCodeRate, the method further includes: determining that the code rate for the first UCI is the first maxCodeRate and the code rate for the second UCI is the second maxCodeRate.

In addition, according to at least one embodiment of the present disclosure, the first UCI and the second UCI are encoded according to the code rate for the first UCI and the code rate for the second UCI, respectively, when transmitting the first UCI and the second UCI in the third PUCCH.

According to another aspect of the present disclosure, at least one embodiment provides a transmission method for PUCCH, including:

if a terminal determines or would at least two PUCCHs which are overlapped, receiving, by a base station, a first UCI and a second UCI transmitted by the terminal in a third PUCCH, the at least two PUCCHs including a first PUCCH and a second PUCCH, the first PUCCH having a first priority index and carrying or corresponding to the first UCI, the second PUCCH having a second priority index and carrying or corresponding to the second UCI, wherein different code rates are used for the first UCI and the second UCI, respectively.

In addition, according to at least one embodiment of the present disclosure, the receiving the first UCI and the second UCI transmitted by the terminal in the third PUCCH includes:

determining the third PUCCH according to a third DCI, wherein the third DCI is used for indicating transmission of the third PUCCH.

In addition, according to at least one embodiment of the present disclosure, the third PUCCH is one of at least one PUCCH resource configured by a third PUCCH configuration, and the PUCCH resource is configured by PUCCH resource configuration information, wherein, the third PUCCH configuration is a PUCCH configuration corresponding to the first priority index of the first PUCCH or the first UCI; or, the third PUCCH configuration is a PUCCH configuration corresponding to the second priority index of the second PUCCH or the second UCI; or, the third PUCCH configuration is a PUCCH configuration configured for transmission of the first UCI and the second UCI.

In addition, according to at least one embodiment of the present disclosure, PUCCH resource configuration information corresponding to the third PUCCH configures one maxCodeRate; PUCCH resource configuration information corresponding to the first PUCCH configures at most one maxCodeRate; PUCCH resource configuration information corresponding to the second PUCCH configures at most one maxCodeRate.

In addition, according to at least one embodiment of the present disclosure, the method further includes:

determining that the code rate for the first UCI is the maxCodeRate configured by the PUCCH resource configuration information corresponding to the third PUCCH, and determining that the code rate for the second UCI is the maxCodeRate configured by the PUCCH resource configuration information corresponding to the second PUCCH;

or, determining that the code rate for the first UCI is the maxCodeRate configured by the PUCCH resource configuration information corresponding to the first PUCCH, and determining that the code rate for the second UCI is the maxCodeRate configured by the PUCCH resource configuration information corresponding to the third PUCCH.

In addition, according to at least one embodiment of the present disclosure, the method further includes:

determining that the code rate for the first UCI is the maxCodeRate configured by the PUCCH resource configuration information corresponding to the third PUCCH, and determining the code rate for the second UCI according to the code rate for the first UCI;

or, determining that the code rate for the second UCI is the maxCodeRate configured by the PUCCH resource configuration information corresponding to the third PUCCH, and determining the code rate for the first UCI according to the code rate for the second UCI.

In addition, according to at least one embodiment of the present disclosure, the method further includes:

determining that the code rate for the first UCI is the maxCodeRate configured by the PUCCH resource configuration information corresponding to the third PUCCH, and if the PUCCH resource configuration information corresponding to the second PUCCH configures the maxCodeRate, determining that the code rate for the second UCI is the maxCodeRate configured by the PUCCH resource configuration information corresponding to the second PUCCH, and if the PUCCH resource configuration information corresponding to the second PUCCH does not configure the maxCodeRate, determining the code rate for the second UCI according to the code rate for the first UCI;

or, determining that the code rate for the second UCI is the maxCodeRate configured by the PUCCH resource configuration information corresponding to the third PUCCH, and if the PUCCH resource configuration information corresponding to the first PUCCH configures the maxCodeRate, determining that the code rate for the first UCI is the maxCodeRate configured by the PUCCH resource configuration information corresponding to the first PUCCH, and if the PUCCH resource configuration information corresponding to the first PUCCH does not configure the maxCodeRate, determining the code rate for the first UCI according to the code rate for the second UCI.

In addition, according to at least one embodiment of the present disclosure, the determining the code rate for the second UCI according to the code rate for the first UCI or the determining the code rate for the first UCI according to the code rate for the second UCI includes:

determining that the code rate for the second UCI is the code rate for the first UCI plus a first adjustment factor, or the code rate for the first UCI minus the first adjustment factor, or the code rate for the first UCI multiplied by the first adjustment factor, or the code rate for the first UCI divided by the first adjustment factor;

or, determining that the code rate for the first UCI is the code rate for the second UCI plus a second adjustment factor, or the code rate for the second UCI minus the second adjustment factor, or the code rate for the second UCI multiplied by the second adjustment factor, or the code rate for the second UCI divided by the second adjustment factor.

In addition, according to at least one embodiment of the present disclosure, the first adjustment factor and/or the second adjustment factor is determined in one of following manners:

the first adjustment factor and/or the second adjustment factor is configured by a network through higher-layer signaling or is defined by a protocol;

or, the first adjustment factor and/or the second adjustment factor is determined from a set of numerical values according to a preset DCI, wherein the set of numerical values is configured by a network through higher-layer signaling or is defined by a protocol.

In addition, according to at least one embodiment of the present disclosure, PUCCH resource configuration information corresponding to the third PUCCH configures a first maxCodeRate and/or a second maxCodeRate.

In addition, according to at least one embodiment of the present disclosure, if the PUCCH resource configuration information corresponding to the third PUCCH configures the first maxCodeRate and the second maxCodeRate, the method further includes: determining that the code rate for the first UCI is the first maxCodeRate and the code rate for the second UCI is the second maxCodeRate.

In addition, according to at least one embodiment of the present disclosure, the first UCI and the second UCI are decoded according to the code rate for the first UCI and the code rate for the second UCI, respectively, when receiving the first UCI and the second UCI transmitted by the terminal in the third PUCCH.

According to another aspect of the present disclosure, at least one embodiment provides a terminal, including: a transmitting module, configured to, if the terminal would transmit at least two PUCCHs which are overlapped, the at least two PUCCHs including a first PUCCH and a second PUCCH, the first PUCCH having a first priority index and carrying or corresponding to a first UCI, the second PUCCH having a second priority index and carrying or corresponding to a second UCI, transmit the first UCI and the second UCI in a third PUCCH, wherein different code rates are used for the first UCI and the second UCI, respectively.

According to another aspect of the present disclosure, at least one embodiment provides a terminal, including a transceiver and a processor, wherein, the transceiver is configured to, if the terminal would transmit at least two PUCCHs which are overlapped, the at least two PUCCHs including a first PUCCH and a second PUCCH, the first PUCCH having a first priority index and carrying or corresponding to a first UCI, the second PUCCH having a second priority index and carrying or corresponding to a second UCI, transmit the first UCI and the second UCI in a third PUCCH, wherein different code rates are used for the first UCI and the second UCI, respectively.

According to another aspect of the present disclosure, at least one embodiment provides a terminal, including a processor, a memory and a program stored in the memory and executable by the processor, wherein the processor is configured to execute the program, to implement the steps of the foregoing transmission method for PUCCH.

According to another aspect of the present disclosure, at least one embodiment provides a base station, including: a receiving module, configured to, if a terminal determines or would at least two PUCCHs which are overlapped, receive a first UCI and a second UCI transmitted by the terminal in a third PUCCH, the at least two PUCCHs including a first PUCCH and a second PUCCH, the first PUCCH having a first priority index and carrying or corresponding to the first UCI, the second PUCCH having a second priority index and carrying or corresponding to the second UCI, wherein different code rates are used for the first UCI and the second UCI, respectively.

According to another aspect of the present disclosure, at least one embodiment provides a base station, including a processor and a transceiver, wherein, the transceiver is configured to, if a terminal determines or would at least two PUCCHs which are overlapped, receive a first UCI and a second UCI transmitted by the terminal in a third PUCCH, the at least two PUCCHs including a first PUCCH and a second PUCCH, the first PUCCH having a first priority index and carrying or corresponding to the first UCI, the second PUCCH having a second priority index and carrying or corresponding to the second UCI, wherein different code rates are used for the first UCI and the second UCI, respectively.

According to another aspect of the present disclosure, at least one embodiment provides a base station, including a processor, a memory and a program stored in the memory and executable by the processor, wherein the processor is configured to execute the program, to implement the steps of the foregoing transmission method for PUCCH.

According to another aspect of the present disclosure, at least one embodiment provides a computer readable storage medium storing thereon a program, wherein the program is configured to be executed by a processor, to implement the steps of the foregoing methods.

Compared with the related art, the transmission method for physical uplink control channel, the terminal and the base station according to the embodiments of the present disclosure may transmit on one PUCCH UCIs that would have been carried on at least two PUCCHs (or would have corresponded to at least two PUCCHs) otherwise, and the embodiments of the present disclosure may perform coding of UCIs that would have otherwise been carried in PUCCHs having different priority indexes by using different code rates, which can satisfy requirements of different services and improve system spectrum efficiency.

BRIEF DESCRIPTION OF THE DRAWINGS

Having read detailed description of optional implementations of the present disclosure set forth below, a person of ordinary skill in the art would easily recognize various additional advantages and benefits. The accompanying drawings are merely for the purpose of illustrating optional implementations of the present disclosure, and are not intended to be construed as a limitation on the present disclosure. The same reference character is used to designate identical components throughout the drawings. In the drawings:

FIG. 3 is a schematic diagram of a scenario of PUCCH overlapping;

FIG. 4 is a schematic diagram of another scenario of PUCCH overlapping;

FIG. 5 is a flow diagram of a transmission method for physical uplink control channel applied to a terminal side according to an embodiment of the present disclosure;

DETAILED DESCRIPTION

Figure 1:
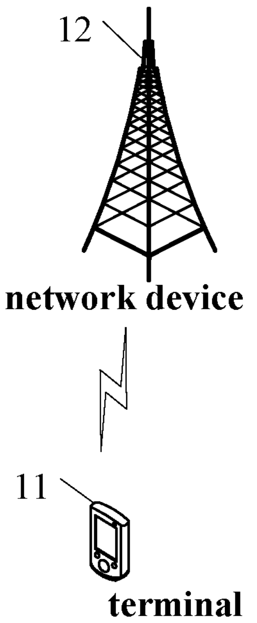
FIG. 1 is a schematic diagram of an application scenario of embodiments of the present disclosure.

Hereinafter, the exemplary embodiments of the present disclosure are described in detail with reference to the accompanying drawings. Although the exemplary embodiments of the present disclosure are illustrated in the accompanying drawings, the disclosure may, however, be embodied in many different forms and should not be construed as being limited to the embodiments set forth herein. Rather, these embodiments are provided so that the present disclosure will be thorough, and will fully convey the scope of the present disclosure to those skilled in the art.

Terms "first", "second" and the like in the specification and claims of this disclosure are adopted not to describe a specific sequence or order but to distinguish similar objects. It should be understood that data used like this may be interchanged under a proper condition for implementation of the embodiments of the disclosure described here in a sequence apart from those shown or described here. In addition, terms "include" and "have" and any variant thereof are intended to cover nonexclusive inclusions. For example, a process, method, system, product or equipment including a series of steps or units is not limited to those steps or units which are clearly listed, but may include other steps or units which are not clearly listed or intrinsic to the process, the method, the product or the equipment. The term "and/or" as used in the description and claims refers to at least one of objects connected by the term.

Techniques described herein are not limited to New Radio (NR) systems and long term evolution (LTE)/LTE-Advanced (LTE-A) systems. They can be utilized in various wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA) and other systems. The terms "system" and "network" are often interchangeable herein. A CDMA system can implement radio technologies such as CDMA2000 or universal terrestrial radio access (UTRA). UTRA includes wideband code division multiple access (WCDMA) and other CDMA variants. A TDMA system can implement radio technologies such as global system for mobile communication (GSM). An OFDMA system can implement radio technologies such as ultra-mobile broadband (UMB), Evolved UTRA (E-UTRA), IEEE 802.21 (Wi-Fi), IEEE 802.16 (WiMAX), IEEE 802.20, or Flash-OFDM. Both UTRA and E-UTRA are a part of universal mobile telecommunication system (UMTS). LTE and more advanced LTE (e.g., LTE-A) are new UMTS versions using E-UTRA. UTRA, E-UTRA, UMTS, LTE, LTE-A and GSM are described in the literatures of an organization named "3rd Generation Partnership Project (3GPP)". CDMA2000 and UMB are described in the literatures of an organization named "3rd Generation Partnership Project 2 (3GPP2)". Techniques described herein can be used in the aforementioned systems and radio technologies, and can be used in other systems and radio technologies as well. The following describes an NR system for exemplary purposes, and NR terminologies are used in most of the following description. However, these techniques may also be applied to an application scenario other than the NR system.

The following description provides examples, and by no means constitutes a limitation on the scope, applicability or configuration described in the claims. Modifications may be made in the functions and arrangements of the discussed elements without departing from the spirit and scope of the present disclosure. Various processes or components can be omitted, replaced or added suitably in various examples. For example, the described method may be performed in an order different from the described order, and various steps may be added, omitted or combined. In addition, features described with reference to some examples may be combined in other examples.

Referring to FIG. 1, FIG. 1 is a block diagram of a wireless communication system to which embodiments of the present disclosure are applicable. The wireless communication system includes a terminal 11 and a network device 12. The terminal 11 may also be referred to as a user terminal or a user equipment (UE). The terminal 11 may be a terminal side device such as a mobile phone, a tablet personal computer, a laptop computer, a personal digital assistant (PDA), a mobile internet device (MID), a wearable device or an in-vehicle device. It needs to be noted that the specific type of the terminal 11 is not limited in the embodiments of the present disclosure. The network device 12 may be a base station and/or a core network network element. The base station may be a base station of 5G or a later version (for example, a gNB or a 5G NR NB) or a base station in another communication system (for example, an evolved NodeB (eNB), a wireless local area network (WLAN) access point or another access point). The base station may be referred to as a node B, an evolved node B, an access point, a base transceiver station (BTS), a radio base station, a radio transceiver, a basic service set (BSS), an extended service set (ESS), a nodeB, an eNB, a home nodeB, a home evolved nodeB, a WLAN access point, a wireless fidelity (WiFi) node or another appropriate term in the field. Provided that the same technical effect is achieved, the base station is not limited to a specific technical term. It needs to be noted that only a base station in an NR system is used as an example in the embodiments of the present disclosure. However, the specific type of the base station is not limited.

The base station may communicate with the terminal 11 under the control of a base station controller. In various examples, the base station controller may be a part of a core network or some base stations. Some base stations may perform communication of control information or user data with a core network by using a backhaul link. In some examples, some of these base stations may directly or indirectly communicate with each other by using a backhaul link. The backhaul link may be a wired or wireless communication link. The wireless communication system may support the operation on a plurality of carriers (waveform signals at different frequencies). A multi-carrier transmitter can transfer modulated signals on the plurality of carriers at the same time. For example, each communication link may be multi-carrier signals modulated according to various radio technologies. Each modulated signal may be transmitted on different carriers and may carry control information (for example, a reference signal, and a control channel), overhead information, data, and the like.

The base station may perform wireless communication with the terminal 11 via one or more access point antennas. Each base station may provide communication coverage for respective coverage area. The coverage area of the access point may be divided into sectors that each only constitutes a part of the coverage area. The wireless communication system may include different types of base stations (for example, a macro base station, a micro base station or a pico base station). The base station may also use different radio technologies such as cellular or WLAN radio access technologies. The base station may be correlated to the same or different access networks or operator deployments. The coverage areas of different base stations (including coverage areas of the same type or different types of base stations, coverage areas using the same radio technology or different radio technologies, or coverage areas that belong to the same access network or different access networks) may overlap.

The communication link in the wireless communication system may include an uplink (UL) used for carrying UL transmission (for example, from the terminal 11 to the network device 12) or a downlink (DL) used for carrying DL transmission (for example, from the network device 12 to the terminal 11). UL transmission may also be referred to as reverse link transmission, and DL transmission may also be referred to as forward link transmission. The DL transmission may be performed by using a licensed band, an unlicensed band or both. Similarly, the UL transmission may be performed by using a licensed band, an unlicensed band or both.

Figure 2:
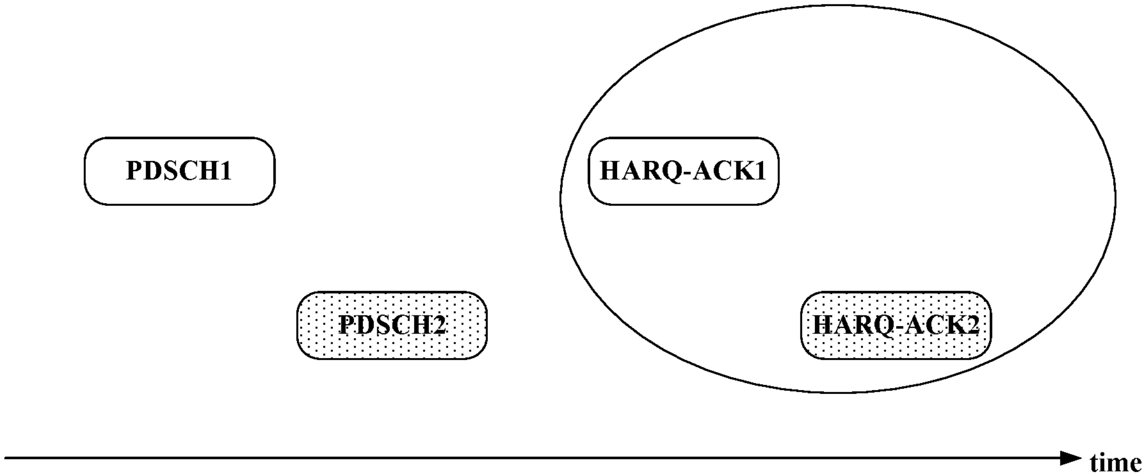
FIG. 2 is a schematic diagram of an overlapping PUCCH scheduling.

A solution for overlapping PUCCH scheduling does not differentiate between PUCCH priorities, and allows overlapping PUCCH scheduling. As shown in FIG. 2, the base station transmits a first DCI to schedule a PDSCH1 and an HARQ-ACK1 corresponding to the PDSCH1, and then the base station transmits a next DCI (last DCI) to schedule a PDSCH2 and an HARQ-ACK2 corresponding to the PDSCH2. As shown in FIG. 2, the resources of the HARQ-ACK1 and HARQ-ACK2 overlap, i.e., at least partially overlap in the time domain. Then, if a multiplexing timeline is satisfied, the terminal may multiplex the HARQ-ACK1 and HARQ-ACK2 onto the same PUCCH for transmission. Another solution differentiates between priorities of PUCCHs/HARQ-ACKs, and allows multiplexed transmission of HARQ-ACKs of the same priority.

The related art generally supports only the multiplexing of UCIs of the same priority. Further, the transmission code rates for the multiplexed UCIs are the same, and the related art cannot use different code rates for transmission in accordance with requirements of different services. For example, if multiplexing of eMBB HARQ-ACK and URLLC HARQ-ACK is supported, since eMBB HARQ-ACK and URLLC HARQ-ACK have different target block error rates (BLERs), they should be transmitted using different code rates, e.g., URLLC HARQ-ACK should be transmitted using a low code rate to ensure the reliability of URLLC HARQ-ACK, while eMBB HARQ-ACK should be transmitted using a high code rate to improve the spectrum efficiency of eMBB HARQ-ACK. In order to solve at least one of the foregoing problems, an embodiment of the present disclosure provides a transmission method for PUCCH, which can realize multiplexed transmission of UCIs having different priority indexes, and can further use different code rates for transmissions of UCIs having different priorities, thereby improving system spectrum efficiency while satisfying requirements of different services.

FIG. 3 and FIG. 4 provide two scenarios in which PUCCH overlapping may occur. In FIG. 3, a first UCI is scheduled first, and then a second UCI is scheduled; in FIG. 4, the second UCI is scheduled first, and then the first UCI is scheduled. In both these two scenarios, the first UCI and the second UCI are likely to overlap. The term "overlap" used in the present disclosure refers to overlapping in a time domain, namely, overlapping partially and fully in the time domain. As a specific example, the PDSCH1 may be an eMBB PDSCH, and the PDSCH2 may be a URLLC PDSCH. Correspondingly, the first UCI may be an eMBB HARQ-ACK, and the second UCI may be a URLLC HARQ-ACK. The above example is merely illustrative, and is not intended to limit the present disclosure.

Referring to FIG. 5, an embodiment of the present disclosure provides a transmission method for PUCCH which is applied to a terminal side. The method includes:

a step 51, if a terminal determines or would transmit at least two PUCCHs which are overlapped, the at least two PUCCHs including a first PUCCH and a second PUCCH, the first PUCCH having a first priority index and carrying or corresponding to a first UCI, the second PUCCH having a second priority index and carrying or corresponding to a second UCI, transmitting, by the terminal, the first UCI and the second UCI in a third PUCCH, wherein different code rates are used for the first UCI and the second UCI.

Through the aforementioned step, the embodiment of the present disclosure may transmit on one PUCCH UCIs that would have been carried on at least two PUCCHs (or would have corresponded to at least two PUCCHs) otherwise, and the embodiment of the present disclosure may perform coding of UCIs that would have otherwise been carried in PUCCHs having different priority indexes by using different code rates, which can satisfy requirements of different services and improve system spectrum efficiency.

Optionally, in an embodiment of the present disclosure, when the terminal needs to transmit the at least two PUCCHs which are overlapped, the terminal transmits the first UCI and the second UCI in the third PUCCH only if the third PUCCH meets a preset condition. The preset condition may be that: the third PUCCH satisfies the latency requirements of the first UCI or the second UCI. For example, an ending symbol of the third PUCCH is not later than the $X^{th}$ symbol after an ending symbol of the first PUCCH, and/or an ending symbol of the third PUCCH is not later than the $Y^{th}$ symbol after an ending symbol of the second PUCCH. Here, X and Y are preset integers respectively.

In an embodiment of the present disclosure, the transmitting, by the terminal, the first UCI and the second UCI in the third PUCCH may specifically include: determining the third PUCCH according to a third DCI, wherein the third DCI is used for indicating transmission of the third PUCCH.

In an embodiment of the present disclosure, the third DCI may be a DCI indicating transmission of the first PUCCH or transmission of the second PUCCH, the first PUCCH and the second PUCCH overlapping. Optionally, the first PUCCH and the second PUCCH are in the same slot/sub-slot. Then the third DCI is the last received DCI (last DCI) among the first DCI and the second DCI. Here, the first DCI is used for indicating transmission of the first PUCCH, and the second DCI is used for indicating transmission of the second PUCCH.

If the third DCI is the first DCI used for indicating transmission of the first PUCCH, the first DCI is the last received DCI among the DCIs scheduling the at least two PUCCHs. If the third DCI is the second DCI used for indicating transmission of the second PUCCH, the second DCI is the last received DCI among the DCIs scheduling the at least two PUCCHs.

The third PUCCH is one of at least one PUCCH resource configured by the third PUCCH configuration (the third PUCCH-Config). Here, the PUCCH resource is specifically configured by PUCCH resource configuration information. More specifically, the third PUCCH-Config may be a PUCCH configuration corresponding to a certain PUCCH among the at least two PUCCHs, or may be a certain PUCCH configuration other than the at least two PUCCHs.

1) The third PUCCH configuration is a PUCCH configuration corresponding to the priority index of the first PUCCH or the first UCI.

In other words, the third PUCCH configuration is a PUCCH configuration corresponding to the priority index of the first PUCCH, or a PUCCH configuration corresponding to the first UCI. It may be understood that, the PUCCH configuration corresponding to the first UCI and the PUCCH configuration corresponding to the priority index of the first PUCCH are different ways of describing the same PUCCH configuration. Similarly, the same is true for the PUCCH configuration corresponding to the second UCI.

2) The third PUCCH configuration is a PUCCH configuration corresponding to the priority index of the second PUCCH or the second UCI.

In other words, the third PUCCH configuration is a PUCCH configuration corresponding to the priority index of the second PUCCH, or a PUCCH configuration corresponding to the second UCI. It may be understood that, the PUCCH configuration corresponding to the second UCI and the PUCCH configuration corresponding to the priority index of the second PUCCH are different ways of describing the same PUCCH configuration.

3) The third PUCCH configuration is a PUCCH configuration configured for transmission of the first UCI and the second UCI.

Here, a third PUCCH configuration is additionally configured for the transmission of the first UCI and the second UCI. Through the third PUCCH configuration, at least one PUCCH resource of the PUCCH for transmitting the first UCI and the second UCI may be configured.

Several implementations of determining the code rates of the first UCI and the second UCI are provided hereinafter.

In the following implementations 1 to 3, PUCCH resource configuration information corresponding to the third PUCCH configures one maximum code rate (maxCodeRate). PUCCH resource configuration information corresponding to the first PUCCH configures at most one maxCodeRate. PUCCH resource configuration information corresponding to the second PUCCH configures at most one maxCodeRate.

Implementation 1

When the third PUCCH configuration is a PUCCH configuration corresponding to the priority index of the first PUCCH or the first UCI, the first DCI indicating transmission of the first PUCCH is the last received DCI among all DCIs indicating transmission of respective ones of the at least two PUCCHs. In the step 51, when the terminal transmits the first UCI and the second UCI in the third PUCCH, the terminal may determine that the code rate for the first UCI is the maxCodeRate configured by the PUCCH resource configuration information corresponding to the third PUCCH, and determine that the code rate for the second UCI is the maxCodeRate configured by the PUCCH resource configuration information corresponding to the second PUCCH.

When the third PUCCH configuration is a PUCCH configuration corresponding to the priority index of the second PUCCH or the second UCI, the first DCI indicating transmission of the second PUCCH is the last received DCI among all DCIs indicating transmission of respective ones of the at least two PUCCHs. In the step 51, when the terminal transmits the first UCI and the second UCI in the third PUCCH, the terminal may determine that the code rate for the first UCI is the maxCodeRate configured by the PUCCH resource configuration information corresponding to the first PUCCH, and determine that the code rate for the second UCI is the maxCodeRate configured by the PUCCH resource configuration information corresponding to the third PUCCH.

Implementation 2

When the third PUCCH configuration is a PUCCH configuration corresponding to the priority index of the first PUCCH or the first UCI, the first DCI indicating transmission of the first PUCCH is the last received DCI among all DCIs indicating transmission of respective ones of the at least two PUCCHs. In the step 51, when the terminal transmits the first UCI and the second UCI in the third PUCCH, the terminal may determine that the code rate for the first UCI is the maxCodeRate configured by the PUCCH resource configuration information corresponding to the third PUCCH, and determine the code rate for the second UCI according to the code rate for the first UCI.

When the third PUCCH configuration is a PUCCH configuration corresponding to the priority index of the second PUCCH or the second UCI, the first DCI indicating transmission of the second PUCCH is the last received DCI among all DCIs indicating transmission of respective ones of the at least two PUCCHs. In the step 51, when the terminal transmits the first UCI and the second UCI in the third PUCCH, the terminal may determine that the code rate for the second UCI is the maxCodeRate configured by the PUCCH resource configuration information corresponding to the third PUCCH, and determine the code rate for the first UCI according to the code rate for the second UCI.

Implementation 3

When the third PUCCH configuration is a PUCCH configuration corresponding to the priority index of the first PUCCH or the first UCI, the first DCI indicating transmission of the first PUCCH is the last received DCI among all DCIs indicating transmission of respective ones of the at least two PUCCHs. In the step 51, when the terminal transmits the first UCI and the second UCI in the third PUCCH, the terminal may determine that the code rate for the first UCI is the maxCodeRate configured by the PUCCH resource configuration information corresponding to the third PUCCH, and if PUCCH resource configuration information corresponding to the second PUCCH configures a maxCodeRate, the terminal determines that the code rate for the second UCI is the maxCodeRate configured by the PUCCH resource configuration information corresponding to the second PUCCH, and if the PUCCH resource configuration information corresponding to the second PUCCH does not configure the maxCodeRate, the terminal determines that the code rate for the second UCI is the code rate for the first UCI plus a third adjustment factor, or the code rate for the first UCI minus the third adjustment factor, or the code rate for the first UCI multiplied by the third adjustment factor, or the code rate for the first UCI divided by the third adjustment factor.

When the third PUCCH configuration is a PUCCH configuration corresponding to the priority index of the second PUCCH or the second UCI, the first DCI indicating transmission of the second PUCCH is the last received DCI among all DCIs indicating transmission of respective ones of the at least two PUCCHs. In the step 51, when the terminal transmits the first UCI and the second UCI in the third PUCCH, the terminal may determine that the code rate for the second UCI is the maxCodeRate configured by the PUCCH resource configuration information corresponding to the third PUCCH, and if PUCCH resource configuration information corresponding to the first PUCCH configures a maxCodeRate, the terminal determines that the code rate for the first UCI is the maxCodeRate configured by the PUCCH resource configuration information corresponding to the first PUCCH, and if the PUCCH resource configuration information corresponding to the first PUCCH does not configure the maxCodeRate, the terminal determines that the code rate for the first UCI is the code rate for the second UCI plus a fourth adjustment factor, or the code rate for the second UCI minus the fourth adjustment factor, or the code rate for the second UCI multiplied by the fourth adjustment factor, or the code rate for the second UCI divided by the fourth adjustment factor.

In the implementations 2 and 3, the determining the code rate for the second UCI according to the code rate for the first UCI may specifically be determining that the code rate for the second UCI is the code rate for the first UCI plus a first adjustment factor, or the code rate for the first UCI minus the first adjustment factor, or the code rate for the first UCI multiplied by the first adjustment factor, or the code rate for the first UCI divided by the first adjustment factor. The determining the code rate for the first UCI according to the code rate for the second UCI may specifically be determining that the code rate for the first UCI is the code rate for the second UCI plus a second adjustment factor, or the code rate for the second UCI minus the second adjustment factor, or the code rate for the second UCI multiplied by the second adjustment factor, or the code rate for the second UCI divided by the second adjustment factor.

The first adjustment factor may be determined in one of following manners:

A) the first adjustment factor is configured by a network (e.g., a base station) through higher-layer signaling or is predefined, e.g., defined by a related protocol;

B) the first adjustment factor is determined from a set of numerical values according to a preset DCI, wherein the set of numerical values is configured by a network through higher-layer signaling or is predefined, e.g., predefined by a protocol.

Similarly, the second adjustment factor may be determined in one of following manners:

A) the second adjustment factor is configured by a network (e.g., a base station) through higher-layer signaling or is predefined, e.g., defined by a related protocol;

B) the second adjustment factor is determined from a set of numerical values according to a preset DCI, wherein the set of numerical values is configured by a network through higher-layer signaling or is predefined, e.g., predefined by a protocol.

The first adjustment factor and/or the second adjustment factor is determined in one of following manners:

the first adjustment factor and/or the second adjustment factor is configured by a network (e.g., base station) through higher-layer signaling or is defined by a protocol;

or, the first adjustment factor and/or the second adjustment factor is determined from a set of numerical values according to a preset DCI, wherein the set of numerical values is configured by a network through higher-layer signaling or is defined by a protocol.

Here, the higher-layer signaling may specifically be one or more of radio resource control (RRC) signaling, medium access control control element (MAC CE) signaling and system information block (SIB) signaling. The first adjustment factor or the second adjustment factor may be configured per-PUCCH format, or configured per-PUCCH resource.

Implementation 4

In the implementation 4, PUCCH resource configuration information corresponding to the third PUCCH configures a first maxCodeRate and/or a second maxCodeRate. For example, the third PUCCH configuration is a PUCCH configuration configured for transmission of the first UCI and the second UCI, and the PUCCH resource configuration information corresponding to the third PUCCH configures the first maxCodeRate and the second maxCodeRate, at this time in the step 51, the terminal may determine that the code rate for the first UCI is the first maxCodeRate and the code rate for the second UCI is the second maxCodeRate.

Here, the corresponding relationship between the first and second maxCodeRates configured by the resource configuration information corresponding to the third PUCCH and the first and second UCIs may be configured by a network through higher-layer signaling or may be predefined, e.g., defined by a related protocol.

Through the above implementations, embodiments of the present disclosure may determine the code rate for the first UCI and the code rate for the second UCI, and, in the step 51, further encode the first UCI and the second UCI according to the code rate for the first UCI and the code rate for the second UCI, respectively.

Furthermore, it is to be noted, in the embodiments of the present disclosure, there is time-domain overlapping (which may be full overlapping or partial overlapping) between any two PUCCHs in the at least two PUCCHs which are overlapped to be transmitted by the terminal. Optionally, the at least two PUCCHs include two different priority indexes, i.e., the first priority index and the second priority index.

The method on the base station side according to an embodiment of the present disclosure is described hereinafter.

Figure 6:
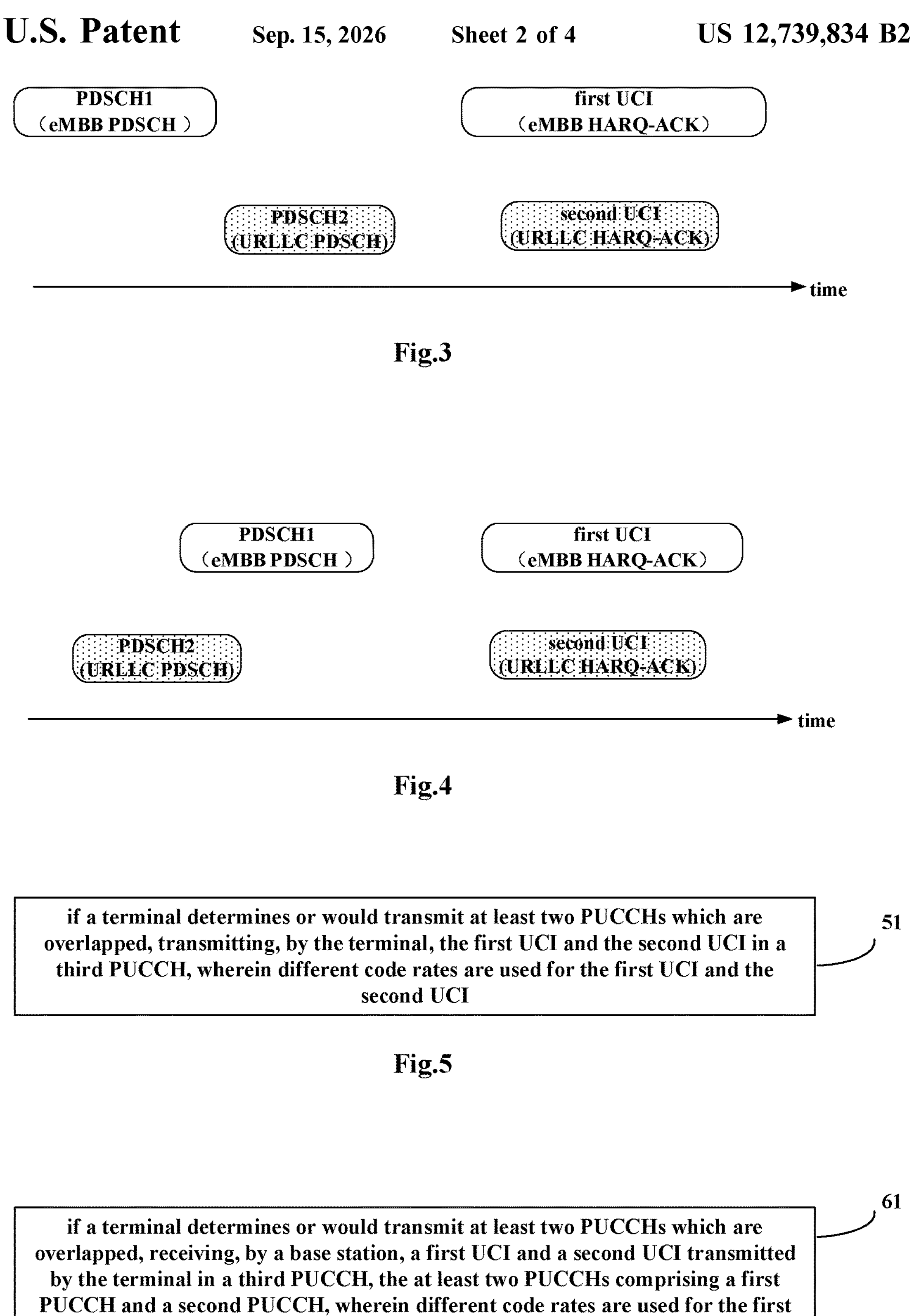
FIG. 6 is a flow diagram of a transmission method for physical uplink control channel applied to a base station side according to an embodiment of the present disclosure.

Referring to FIG. 6, an embodiment of the present disclosure provides a transmission method for PUCCH which is applied to a base station side. The method includes:

a step 61, if a terminal determines or would transmit at least two PUCCHs which are overlapped, receiving, by a base station, a first UCI and a second UCI transmitted by the terminal in a third PUCCH, the at least two PUCCHs including a first PUCCH and a second PUCCH, the first PUCCH having a first priority index and carrying or corresponding to the first UCI, the second PUCCH having a second priority index and carrying or corresponding to the second UCI, wherein different code rates are used for the first UCI and the second UCI.

Through the aforementioned step, the embodiment of the present disclosure may receive on one PUCCH UCIs that would have been carried (borne) on at least two PUCCHs (or would have corresponded to at least two PUCCHs) otherwise, and the embodiment of the present disclosure may perform coding of UCIs that would have otherwise been carried (borne) in PUCCHs having different priority indexes by using different code rates, which can satisfy requirements of different services and improve system spectrum efficiency.

In an embodiment of the present disclosure, the receiving, by the base station, the first UCI and the second UCI in the third PUCCH may specifically include: determining the third PUCCH according to a third DCI, wherein the third DCI is used for indicating transmission of the third PUCCH.

In an embodiment of the present disclosure, the third DCI may be a DCI indicating transmission of the first PUCCH or transmission of the second PUCCH, the first PUCCH and the second PUCCH overlapping. Optionally, the first PUCCH and the second PUCCH are in the same slot/sub-slot. Then the third DCI is the last received DCI (last DCI) among the first DCI and the second DCI. Here, the first DCI is used for indicating transmission of the first PUCCH, and the second DCI is used for indicating transmission of the second PUCCH.

If the third DCI is the first DCI used for indicating transmission of the first PUCCH, the first DCI is the last DCI transmitted to the terminal among the DCIs scheduling the at least two PUCCHs. If the third DCI is the second DCI used for indicating transmission of the second PUCCH, the second DCI is the last DCI transmitted to the terminal among the DCIs scheduling the at least two PUCCHs.

The third PUCCH is one of at least one PUCCH resource configured by the third PUCCH configuration (the third PUCCH-Config). Here, the PUCCH resource is specifically configured by PUCCH resource configuration information. More specifically, the third PUCCH-Config may be a PUCCH configuration corresponding to a certain PUCCH among the at least two PUCCHs, or may be a certain PUCCH configuration other than the at least two PUCCHs.

1) The third PUCCH configuration is a PUCCH configuration corresponding to the priority index of the first PUCCH or the first UCI.

In other words, the third PUCCH configuration is a PUCCH configuration corresponding to the priority index of the first PUCCH, or a PUCCH configuration corresponding to the first UCI. It may be understood that, the PUCCH configuration corresponding to the first UCI and the PUCCH configuration corresponding to the priority index of the first PUCCH are different ways of describing the same PUCCH configuration. Similarly, the same is true for the PUCCH configuration corresponding to the second UCI.

2) The third PUCCH configuration is a PUCCH configuration corresponding to the priority index of the second PUCCH or the second UCI.

In other words, the third PUCCH configuration is a PUCCH configuration corresponding to the priority index of the second PUCCH, or a PUCCH configuration corresponding to the second UCI. It may be understood that, the PUCCH configuration corresponding to the second UCI and the PUCCH configuration corresponding to the priority index of the second PUCCH are different ways of describing the same PUCCH configuration.

3) The third PUCCH configuration is a PUCCH configuration configured for transmission of the first UCI and the second UCI.

Here, the base station may additionally configure a third PUCCH configuration for the transmission of the first UCI and the second UCI. Through the third PUCCH configuration, at least one PUCCH resource of the PUCCH for transmitting the first UCI and the second UCI may be configured.

Several implementations of determining the code rates of the first UCI and the second UCI are provided hereinafter.

In the following implementations 1 to 3, PUCCH resource configuration information corresponding to the third PUCCH configures one maximum code rate (maxCodeRate). PUCCH resource configuration information corresponding to the first PUCCH configures at most one maxCodeRate. PUCCH resource configuration information corresponding to the second PUCCH configures at most one maxCodeRate.

Implementation 1

When the third PUCCH configuration is a PUCCH configuration corresponding to the priority index of the first PUCCH or the first UCI, the first DCI indicating transmission of the first PUCCH is the last received DCI among all DCIs indicating transmission of respective ones of the at least two PUCCHs. In the step 61, when the base station receives the first UCI and the second UCI in the third PUCCH, the base station may determine that the code rate for the first UCI is the maxCodeRate configured by the PUCCH resource configuration information corresponding to the third PUCCH, and determine that the code rate for the second UCI is the maxCodeRate configured by the PUCCH resource configuration information corresponding to the second PUCCH.

When the third PUCCH configuration is a PUCCH configuration corresponding to the priority index of the second PUCCH or the second UCI, the first DCI indicating transmission of the second PUCCH is the last received DCI among all DCIs indicating transmission of respective ones of the at least two PUCCHs. In the step 61, when the base station receives the first UCI and the second UCI in the third PUCCH, the base station may determine that the code rate for the first UCI is the maxCodeRate configured by the PUCCH resource configuration information corresponding to the first PUCCH, and determine that the code rate for the second UCI is the maxCodeRate configured by the PUCCH resource configuration information corresponding to the third PUCCH.

Implementation 2

When the third PUCCH configuration is a PUCCH configuration corresponding to the priority index of the first PUCCH or the first UCI, the first DCI indicating transmission of the first PUCCH is the last received DCI among all DCIs indicating transmission of respective ones of the at least two PUCCHs. In the step 61, when the base station receives the first UCI and the second UCI in the third PUCCH, the base station may determine that the code rate for the first UCI is the maxCodeRate configured by the PUCCH resource configuration information corresponding to the third PUCCH, and determine the code rate for the second UCI according to the code rate for the first UCI.

When the third PUCCH configuration is a PUCCH configuration corresponding to the priority index of the second PUCCH or the second UCI, the first DCI indicating transmission of the second PUCCH is the last received DCI among all DCIs indicating transmission of respective ones of the at least two PUCCHs. In the step 61, when the base station receives the first UCI and the second UCI in the third PUCCH, the base station may determine that the code rate for the second UCI is the maxCodeRate configured by the PUCCH resource configuration information corresponding to the third PUCCH, and determine the code rate for the first UCI according to the code rate for the second UCI.

Implementation 3

When the third PUCCH configuration is a PUCCH configuration corresponding to the priority index of the first PUCCH or the first UCI, the first DCI indicating transmission of the first PUCCH is the last received DCI among all DCIs indicating transmission of respective ones of the at least two PUCCHs. In the step 61, when the base station receives the first UCI and the second UCI in the third PUCCH, the base station may determine that the code rate for the first UCI is the maxCodeRate configured by the PUCCH resource configuration information corresponding to the third PUCCH, and if PUCCH resource configuration information corresponding to the second PUCCH configures a maxCodeRate, the base station determines that the code rate for the second UCI is the maxCodeRate configured by the PUCCH resource configuration information corresponding to the second PUCCH, and if the PUCCH resource configuration information corresponding to the second PUCCH does not configure the maxCodeRate, the base station determines that the code rate for the second UCI is the code rate for the first UCI plus a third adjustment factor, or the code rate for the first UCI minus the third adjustment factor, or the code rate for the first UCI multiplied by the third adjustment factor, or the code rate for the first UCI divided by the third adjustment factor.

When the third PUCCH configuration is a PUCCH configuration corresponding to the priority index of the second PUCCH or the second UCI, the first DCI indicating transmission of the second PUCCH is the last received DCI among all DCIs indicating transmission of respective ones of the at least two PUCCHs. In the step 61, when the base station receives the first UCI and the second UCI in the third PUCCH, the base station may determine that the code rate for the second UCI is the maxCodeRate configured by the PUCCH resource configuration information corresponding to the third PUCCH, and if PUCCH resource configuration information corresponding to the first PUCCH configures a maxCodeRate, the base station determines that the code rate for the first UCI is the maxCodeRate configured by the PUCCH resource configuration information corresponding to the first PUCCH, and if the PUCCH resource configuration information corresponding to the first PUCCH does not configure the maxCodeRate, the base station determines that the code rate for the first UCI is the code rate for the second UCI plus a fourth adjustment factor, or the code rate for the second UCI minus the fourth adjustment factor, or the code rate for the second UCI multiplied by the fourth adjustment factor, or the code rate for the second UCI divided by the fourth adjustment factor.

In the implementations 2 and 3, the determining the code rate for the second UCI according to the code rate for the first UCI may specifically be determining that the code rate for the second UCI is the code rate for the first UCI plus a first adjustment factor, or the code rate for the first UCI minus the first adjustment factor, or the code rate for the first UCI multiplied by the first adjustment factor, or the code rate for the first UCI divided by the first adjustment factor. The determining the code rate for the first UCI according to the code rate for the second UCI may specifically be determining that the code rate for the first UCI is the code rate for the second UCI plus a second adjustment factor, or the code rate for the second UCI minus the second adjustment factor, or the code rate for the second UCI multiplied by the second adjustment factor, or the code rate for the second UCI divided by the second adjustment factor.

The first adjustment factor may be determined in one of following manners:

A) the first adjustment factor is configured by a network (e.g., a base station) through higher-layer signaling or is predefined, e.g., defined by a related protocol;

B) the first adjustment factor is determined from a set of numerical values according to a preset DCI, wherein the set of numerical values is configured by a network through higher-layer signaling or is predefined, e.g., predefined by a protocol.

Similarly, the second adjustment factor may be determined in one of following manners:

A) the second adjustment factor is configured by a network (e.g., a base station) through higher-layer signaling or is predefined, e.g., defined by a related protocol;

B) the second adjustment factor is determined from a set of numerical values according to a preset DCI, wherein the set of numerical values is configured by a network through higher-layer signaling or is predefined, e.g., predefined by a protocol.

The first adjustment factor and/or the second adjustment factor is determined in one of following manners:

the first adjustment factor and/or the second adjustment factor is configured by a network (e.g., base station) through higher-layer signaling or is defined by a protocol;

or, the first adjustment factor and/or the second adjustment factor is determined from a set of numerical values according to a preset DCI, wherein the set of numerical values is configured by a network through higher-layer signaling or is defined by a protocol.

Here, the higher-layer signaling may specifically be one or more of radio resource control (RRC) signaling, medium access control control element (MAC CE) signaling and system information block (SIB) signaling. The first adjustment factor or the second adjustment factor may be configured per-PUCCH format, or configured per-PUCCH resource.

Implementation 4

In the implementation 4, PUCCH resource configuration information corresponding to the third PUCCH configures a first maxCodeRate and/or a second maxCodeRate. For example, the third PUCCH configuration is a PUCCH configuration configured for transmission of the first UCI and the second UCI, and the PUCCH resource configuration information corresponding to the third PUCCH configures the first maxCodeRate and the second maxCodeRate. For another example, the third PUCCH configuration may be a PUCCH configuration corresponding to the first priority index, or a PUCCH configuration corresponding to the second priority index, and the PUCCH resource configuration information corresponding to the third PUCCH may configure the first maxCodeRate and the second maxCodeRate as well. At this time, in the step 61, the base station may determine that the code rate for the first UCI is the first maxCodeRate and the code rate for the second UCI is the second maxCodeRate.

Here, the corresponding relationship between the first and second maxCodeRates configured by the resource configuration information corresponding to the third PUCCH and the first and second UCIs may be configured by a network through higher-layer signaling or may be predefined, e.g., defined by a related protocol.

Through the above implementations, embodiments of the present disclosure may determine the code rate for the first UCI and the code rate for the second UCI, and, in the step 61, further decode and receive the first UCI and the second UCI according to the code rate for the first UCI and the code rate for the second UCI, respectively.

To facilitate a better understanding of the embodiments of the present disclosure, several examples are provided hereinafter. It is noted, the following examples are described assuming that the first UCI and the second UCI are URLLC HARQ-ACK and eMBB HARQ-ACK, respectively. However, the present disclosure is not limited to the scenario.

Example 1

Two PUCCH configurations (PUCCH-Config) are configured, wherein the first PUCCH-Config corresponds to a UCI with a first priority index (first UCI), and the second PUCCH-Config corresponds to a UCI with a second priority index (second UCI).

As illustrated in a scenario 1 shown in FIG. 3, it is assumed that PUSCH1 is an eMBB PDSCH, and PDSCH2 is a URLLC PDSCH. The terminal first receives the eMBB PDSCH, and the PUCCH resource where the HARQ-ACK corresponding to the eMBB PDSCH is located is the first UCI in FIG. 3 (eMBB HARQ-ACK); the terminal subsequently receives the URLLC PDSCH, and the PUCCH resource where the HARQ-ACK corresponding to the URLLC PDSCH is located is the second UCI in FIG. 3 (URLLC HARQ-ACK). When a processing timeline condition is met, the terminal multiplexes the eMBB HARQ-ACK information and the URLLC HARQ-ACK information on the third PUCCH resource for transmission, wherein the third PUCCH resource is configured by a first PUCCH-Config, and indicated by a last received DCI (last DCI format), wherein the code rate for the URLLC HARQ-ACK information is the maxCodeRate of the PUCCH resource URLLC HARQ-ACK configuration; the code rate for the eMBB HARQ-ACK information is the maxCodeRate of the PUCCH resource eMBB HARQ-ACK configuration.

Example 2

Two PUCCH configurations (PUCCH-Configs) are configured, wherein the first PUCCH-Config corresponds to a UCI with a first priority index, and the second PUCCH-Config corresponds to a UCI with a second priority index.

As illustrated in the scenario 1 shown in FIG. 3, it is assumed that PUSCH1 is an eMBB PDSCH, and PDSCH2 is a URLLC PDSCH. As shown in the scenario 1, the terminal first receives the eMBB PDSCH, and the PUCCH resource where the HARQ-ACK corresponding to the eMBB PDSCH is located is the first UCI in FIG. 3 (eMBB HARQ-ACK); the terminal subsequently receives the URLLC PDSCH, and the PUCCH resource where the HARQ-ACK corresponding to the URLLC PDSCH is located is the second UCI in FIG. 3 (URLLC HARQ-ACK). When a processing timeline condition is met, the terminal multiplexes the eMBB HARQ-ACK information and the URLLC HARQ-ACK information on the third PUCCH resource for transmission, wherein the third PUCCH resource is configured by a first PUCCH-Config, and indicated by a last received DCI (last DCI format), wherein the code rate for the URLLC HARQ-ACK information is the maxCodeRate of the PUCCH resource URLLC HARQ-ACK configuration; the code rate for the eMBB HARQ-ACK information is the maxCodeRate of the PUCCH resource URLLC HARQ-ACK configuration plus/minus/multiplied by/divided by the first adjustment factor.

Example 3

Two PUCCH-Configs are configured, wherein the first PUCCH-Config corresponds to a UCI with a first priority index, and the second PUCCH-Config corresponds to a UCI with a second priority index.

As illustrated in the scenario 1 shown in FIG. 3, the terminal first receives the eMBB PDSCH, and the PUCCH resource where the HARQ-ACK corresponding to the eMBB PDSCH is located is the first UCI in FIG. 3 (eMBB HARQ-ACK); the terminal subsequently receives the URLLC PDSCH, and the PUCCH resource where the HARQ-ACK corresponding to the URLLC PDSCH is located is the second UCI in FIG. 3 (URLLC HARQ-ACK). When a processing timeline condition is met, the terminal multiplexes the eMBB HARQ-ACK information and the URLLC HARQ-ACK information on the third PUCCH resource for transmission, wherein the third PUCCH resource is configured by a first PUCCH-Config, and indicated by a last DCI format, wherein the code rate for the URLLC HARQ-ACK information is a first maxCodeRate of the PUCCH resource URLLC HARQ-ACK configuration; the code rate for the eMBB HARQ-ACK information is a second maxCodeRate of the PUCCH resource URLLC HARQ-ACK configuration.

Here, two maximum code rates (maxCodeRates) are configured per-PUCCH resource or per-PUCCH format.

Example 4

Three PUCCH-Configs are configured, wherein the first PUCCH-Config corresponds to a UCI with a first priority index, the second PUCCH-Config corresponds to a UCI with a second priority index, and the third PUCCH-Config corresponds to the UCI with the first priority index and the UCI with the second priority index. In other words, when the terminal needs to multiplex the UCI with the first priority index and the UCI with the second priority index, the terminal uses the configuration of the third PUCCH-Config.

As illustrated in the scenario 1 shown in FIG. 3, the terminal first receives the eMBB PDSCH, and the PUCCH resource where the HARQ-ACK corresponding to the eMBB PDSCH is located is the eMBB HARQ-ACK in FIG. 3; the terminal subsequently receives the URLLC PDSCH, and the PUCCH resource where the HARQ-ACK corresponding to the URLLC PDSCH is located is the URLLC HARQ-ACK in FIG. 3. When a processing timeline condition is met, the terminal multiplexes the eMBB HARQ-ACK information and the URLLC HARQ-ACK information on the third PUCCH resource for transmission, wherein the third PUCCH resource is configured by the third PUCCH-Config, and indicated by a last DCI format, wherein it is determined that the code rate for the URLLC HARQ-ACK information is a first maxCodeRate of the third PUCCH resource configuration; it is determined that the code rate for the eMBB HARQ-ACK information is a second maxCodeRate of the third PUCCH resource configuration.

Various method according to the embodiments of the present disclosure are described above. The apparatuses implementing the methods are further described hereinafter.

Figure 7:
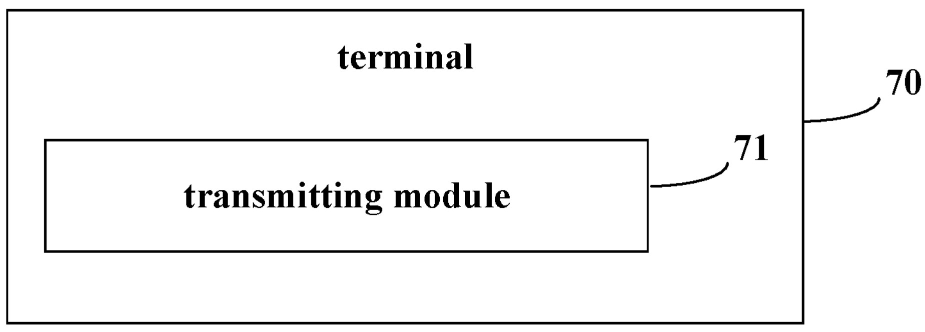
FIG. 7 is a schematic structural diagram of a terminal according to an embodiment of the present disclosure.

Referring to FIG. 7, an embodiment of the present disclosure provides a terminal 70, including:

a transmitting module 71, configured to, if the terminal 70 would transmit at least two PUCCHs which are overlapped, the at least two PUCCHs including a first PUCCH and a second PUCCH, the first PUCCH having a first priority index and carrying or corresponding to a first UCI, the second PUCCH having a second priority index and carrying or corresponding to a second UCI, transmit the first UCI and the second UCI in a third PUCCH, wherein different code rates are used for the first UCI and the second UCI.

Optionally, the terminal further includes: a first determination module, configured to determine the third PUCCH according to a third DCI, wherein the third DCI is used for indicating transmission of the third PUCCH.

Optionally, the third PUCCH is one of at least one PUCCH resource configured by a third PUCCH configuration, and the PUCCH resource is configured by PUCCH resource configuration information, wherein, the third PUCCH configuration is a PUCCH configuration corresponding to the priority index of the first PUCCH or the first UCI; or, the third PUCCH configuration is a PUCCH configuration corresponding to the priority index of the second PUCCH or the second UCI; or, the third PUCCH configuration is a PUCCH configuration configured for transmission of the first UCI and the second UCI.

Optionally, PUCCH resource configuration information corresponding to the third PUCCH configures one maxCodeRate; PUCCH resource configuration information corresponding to the first PUCCH configures at most one maxCodeRate; PUCCH resource configuration information corresponding to the second PUCCH configures at most one maxCodeRate.

Optionally, the terminal further includes:

a second determination module, configured to:

if the third PUCCH configuration is a PUCCH configuration corresponding to the priority index of the first PUCCH or the first UCI, determine that the code rate for the first UCI is a maxCodeRate configured by PUCCH resource configuration information corresponding to the third PUCCH, and determine that the code rate for the second UCI is a maxCodeRate configured by PUCCH resource configuration information corresponding to the second PUCCH;

if the third PUCCH configuration is a PUCCH configuration corresponding to the priority index of the second PUCCH or the second UCI, determine that the code rate for the first UCI is a maxCodeRate configured by PUCCH resource configuration information corresponding to the first PUCCH, and determine that the code rate for the second UCI is a maxCodeRate configured by PUCCH resource configuration information corresponding to the third PUCCH.

Optionally, the terminal further includes:

a third determination module, configured to:

if the third PUCCH configuration is a PUCCH configuration corresponding to the priority index of the first PUCCH or the first UCI, determine that the code rate for the first UCI is a maxCodeRate configured by PUCCH resource configuration information corresponding to the third PUCCH, and determine the code rate for the second UCI according to the code rate for the first UCI;

if the third PUCCH configuration is a PUCCH configuration corresponding to the priority index of the second PUCCH or the second UCI, determine that the code rate for the second UCI is a maxCodeRate configured by PUCCH resource configuration information corresponding to the third PUCCH, and determine the code rate for the first UCI according to the code rate for the second UCI.

Optionally, the terminal further includes:

a fourth determination module, configured to:

if the third PUCCH configuration is a PUCCH configuration corresponding to the priority index of the first PUCCH or the first UCI, determine that the code rate for the first UCI is a maxCodeRate configured by PUCCH resource configuration information corresponding to the third PUCCH, and if PUCCH resource configuration information corresponding to the second PUCCH configures a maxCodeRate, determine that the code rate for the second UCI is the maxCodeRate configured by the PUCCH resource configuration information corresponding to the second PUCCH, and if the PUCCH resource configuration information corresponding to the second PUCCH does not configure the maxCodeRate, determine the code rate for the second UCI according to the code rate for the first UCI;

if the third PUCCH configuration is a PUCCH configuration corresponding to the priority index of the second PUCCH or the second UCI, determine that the code rate for the second UCI is a maxCodeRate configured by PUCCH resource configuration information corresponding to the third PUCCH, and if PUCCH resource configuration information corresponding to the first PUCCH configures a maxCodeRate, determine that the code rate for the first UCI is the maxCodeRate configured by the PUCCH resource configuration information corresponding to the first PUCCH, and if the PUCCH resource configuration information corresponding to the first PUCCH does not configure the maxCodeRate, determine the code rate for the first UCI according to the code rate for the second UCI.

Optionally, the terminal further includes:

a fifth determination module, configured to:

determine that the code rate for the second UCI is the code rate for the first UCI plus a first adjustment factor, or the code rate for the first UCI minus the first adjustment factor, or the code rate for the first UCI multiplied by the first adjustment factor, or the code rate for the first UCI divided by the first adjustment factor;

or, determine that the code rate for the first UCI is the code rate for the second UCI plus a second adjustment factor, or the code rate for the second UCI minus the second adjustment factor, or the code rate for the second UCI multiplied by the second adjustment factor, or the code rate for the second UCI divided by the second adjustment factor.

Optionally, the first adjustment factor and/or the second adjustment factor is determined in one of following manners:

the first adjustment factor and/or the second adjustment factor is configured by a network through higher-layer signaling or is defined by a protocol;

or, the first adjustment factor and/or the second adjustment factor is determined from a set of numerical values according to a preset DCI, wherein the set of numerical values is configured by a network through higher-layer signaling or is defined by a protocol;

wherein, the adjustment factors are configured per-PUCCH format, or configured per-PUCCH resource.

Optionally, PUCCH resource configuration information corresponding to the third PUCCH configures a first maxCodeRate and/or a second maxCodeRate.

Optionally, the terminal further includes:

a sixth determination module, configured to:

if the third PUCCH configuration is a PUCCH configuration configured for transmission of the first UCI and the second UCI, and the resource configuration information corresponding to the third PUCCH configures the first maxCodeRate and the second maxCodeRate, determine that the code rate for the first UCI is the first maxCodeRate and the code rate for the second UCI is the second maxCodeRate.

Optionally, the terminal further includes:

an encoding module, configured to encode the first UCI and the second UCI according to the code rate for the first UCI and the code rate for the second UCI, respectively, when transmitting the first UCI and the second UCI in the third PUCCH.

It is noted, the apparatus in the embodiment corresponds to the method shown in FIG. 5, and the implementations in the foregoing embodiments are applicable to the embodiment of the apparatus, and can achieve the same technical effect. The apparatus according the embodiment of the present disclosure can implement all method steps of the foregoing method embodiments, and can achieve the same technical effect, thus a detailed description of the part of the embodiment same as the method embodiments and beneficial effect thereof are omitted herein.

Figure 8:
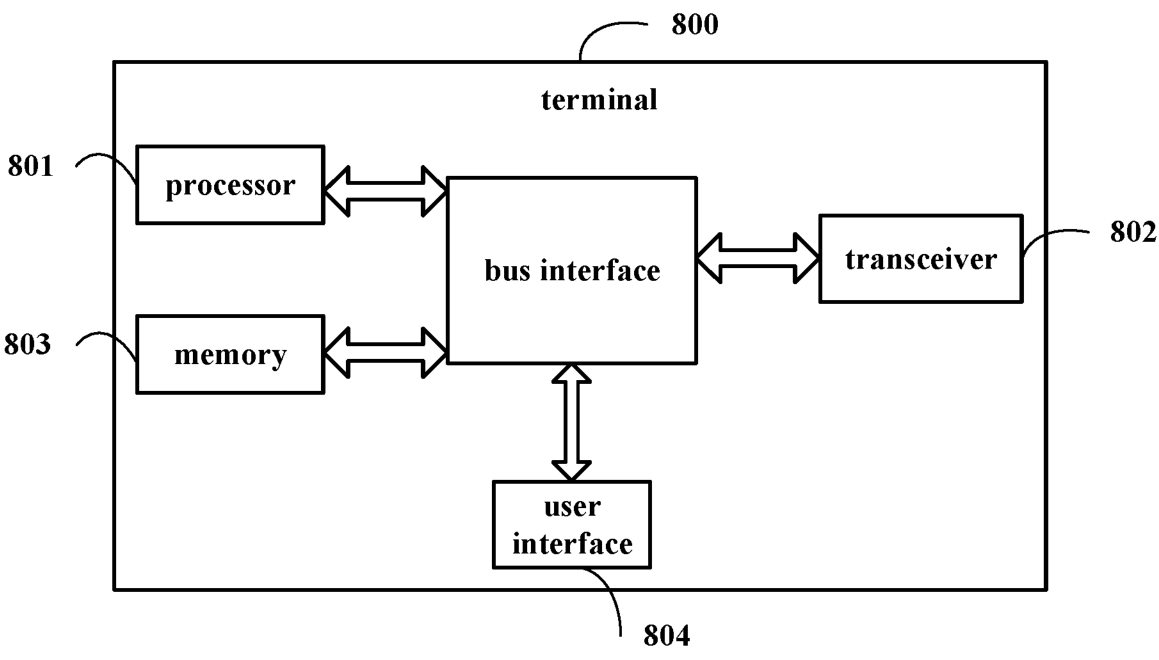
FIG. 8 is another schematic structural diagram of a terminal according to an embodiment of the present disclosure.

Referring to FIG. 8, which is a schematic structural diagram of a terminal according to an embodiment of the present disclosure, the terminal 800 includes: a processor 801, a transceiver 802, a memory 803, a user interface 804 and a bus interface.

In an embodiment of the present disclosure, the terminal 800 further includes a program stored in the memory 803 and executable by the processor 801.

The processor 801 is configured to execute the program to implement:

if the terminal determines or would transmit at least two PUCCHs which are overlapped, the at least two PUCCHs including a first PUCCH and a second PUCCH, the first PUCCH having a first priority index and carrying or corresponding to a first UCI, the second PUCCH having a second priority index and carrying or corresponding to a second UCI, transmitting the first UCI and the second UCI in a third PUCCH, wherein different code rates are used for the first UCI and the second UCI.

It may be understood, in embodiments of the present disclosure, when the computer program is executed by the processor 801, various processes of the embodiment of the transmission method for PUCCH as shown in FIG. 5 can be implemented, and the same technical effects may be achieved. To avoid repetition, a detailed description is omitted herein.

In FIG. 8, a bus architecture may include any quantity of interconnected buses and bridges. Specifically, various circuits such as one or more processors represented by the processor 801 and a memory represented by the memory 803 are linked together. The bus architecture may also link various other circuits such as peripherals, voltage regulators, and power management circuits, which are well known in the art, and therefore are not further described herein. The bus interface provides an interface. The transceiver 802 may include a plurality of elements, that is, a transmitter and a receiver, to provide units for communicating with various other apparatuses over a transmission medium. For different user devices, a user interface 804 may be an interface capable of externally/internally connecting desired devices, including, but not limited to, a keypad, a display, a speaker, a microphone, and a joystick.

The processor 801 is responsible for managing the bus architecture and general processing. The memory 803 can store data used by the processor 801 while performing operations.

It is noted, the terminal in the embodiment corresponds to the method shown in FIG. 5, and the implementations in the foregoing embodiments are applicable to the embodiment of the apparatus, and can achieve the same technical effect. In the terminal, the transceiver 802 and the memory 803 may be communicatively connected via a bus interface, and the transceiver 802 and the processor 801 may be communicatively connected via the bus interface. The function of the processor 801 may be implemented by the transceiver 802, and the function of the transceiver 802 may be implemented by the processor 801. It is noted, the terminal according the embodiment of the present disclosure can implement all method steps of the foregoing method embodiments, and can achieve the same technical effect, thus a detailed description of the part of the embodiment same as the method embodiments and beneficial effect thereof are omitted herein.

In some embodiments of the present disclosure, a computer readable storage medium storing a program is further provided. The program is configured to be executed by a processor to implement the following step:

if a terminal determines or would transmit at least two PUCCHs which are overlapped, the at least two PUCCHs including a first PUCCH and a second PUCCH, the first PUCCH having a first priority index and carrying or corresponding to a first UCI, the second PUCCH having a second priority index and carrying or corresponding to a second UCI, transmitting the first UCI and the second UCI in a third PUCCH, wherein different code rates are used for the first UCI and the second UCI.

When the program is executed by the processor, various implementations of the transmission method for PUCCH applied to the terminal side can be implemented, and the same technical effects may be achieved. To avoid repetition, a detailed description is omitted herein.

Figure 9:
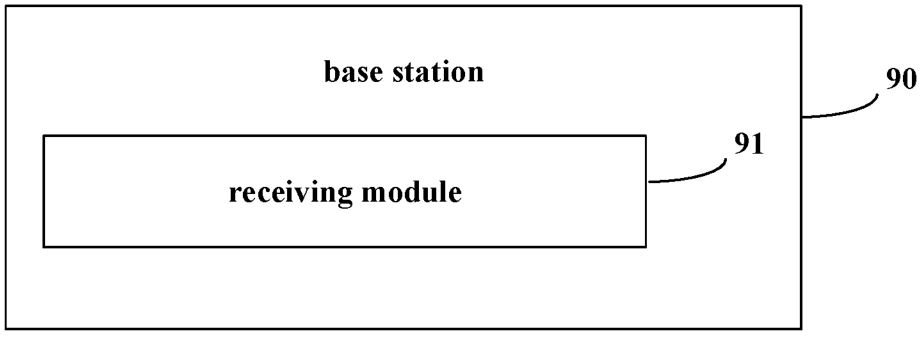
FIG. 9 is a schematic structural diagram of a base station according to an embodiment of the present disclosure.

An embodiment of the present disclosure provides a base station 90 shown in FIG. 9, which includes:

a receiving module 91, configured to, if a terminal determines or would transmit at least two PUCCHs which are overlapped, receive a first UCI and a second UCI transmitted by the terminal in a third PUCCH, the at least two PUCCHs comprising a first PUCCH and a second PUCCH, the first PUCCH having a first priority index and carrying or corresponding to the first UCI, the second PUCCH having a second priority index and carrying or corresponding to the second UCI, wherein different code rates are used for the first UCI and the second UCI.

Optionally, the base station further includes:

a first determination module, configured to determine the third PUCCH according to a third DCI, wherein the third DCI is used for indicating transmission of the third PUCCH.

Optionally, the third PUCCH is one of at least one PUCCH resource configured by a third PUCCH configuration, and the PUCCH resource is configured by PUCCH resource configuration information, wherein, the third PUCCH configuration is a PUCCH configuration corresponding to the first priority index of the first PUCCH or the first UCI; or, the third PUCCH configuration is a PUCCH configuration corresponding to the second priority index of the second PUCCH or the second UCI; or, the third PUCCH configuration is a PUCCH configuration configured for transmission of the first UCI and the second UCI.

Optionally, PUCCH resource configuration information corresponding to the third PUCCH configures one maxCodeRate; PUCCH resource configuration information corresponding to the first PUCCH configures at most one maxCodeRate; PUCCH resource configuration information corresponding to the second PUCCH configures at most one maxCodeRate.

Optionally, the base station further includes:

a second determination module, configured to:

if the third PUCCH configuration is a PUCCH configuration corresponding to the priority index of the first PUCCH or the first UCI, determine that the code rate for the first UCI is a maxCodeRate configured by PUCCH resource configuration information corresponding to the third PUCCH, and determine that the code rate for the second UCI is a maxCodeRate configured by PUCCH resource configuration information corresponding to the second PUCCH;

if the third PUCCH configuration is a PUCCH configuration corresponding to the priority index of the second PUCCH or the second UCI, determine that the code rate for the first UCI is a maxCodeRate configured by PUCCH resource configuration information corresponding to the first PUCCH, and determine that the code rate for the second UCI is a maxCodeRate configured by PUCCH resource configuration information corresponding to the third PUCCH.

Optionally, the base station further includes:

a third determination module, configured to:

if the third PUCCH configuration is a PUCCH configuration corresponding to the priority index of the first PUCCH or the first UCI, determine that the code rate for the first UCI is a maxCodeRate configured by PUCCH resource configuration information corresponding to the third PUCCH, and determine the code rate for the second UCI according to the code rate for the first UCI;

if the third PUCCH configuration is a PUCCH configuration corresponding to the priority index of the second PUCCH or the second UCI, determine that the code rate for the second UCI is a maxCodeRate configured by PUCCH resource configuration information corresponding to the third PUCCH, and determine the code rate for the first UCI according to the code rate for the second UCI.

Optionally, the base station further includes:

a fourth determination module, configured to:

if the third PUCCH configuration is a PUCCH configuration corresponding to the priority index of the first PUCCH or the first UCI, determine that the code rate for the first UCI is a maxCodeRate configured by PUCCH resource configuration information corresponding to the third PUCCH, and if PUCCH resource configuration information corresponding to the second PUCCH configures a maxCodeRate, determine that the code rate for the second UCI is the maxCodeRate configured by the PUCCH resource configuration information corresponding to the second PUCCH, and if the PUCCH resource configuration information corresponding to the second PUCCH does not configure the maxCodeRate, determine the code rate for the second UCI according to the code rate for the first UCI;

if the third PUCCH configuration is a PUCCH configuration corresponding to the priority index of the second PUCCH or the second UCI, determine that the code rate for the second UCI is a maxCodeRate configured by PUCCH resource configuration information corresponding to the third PUCCH, and if PUCCH resource configuration information corresponding to the first PUCCH configures a maxCodeRate, determine that the code rate for the first UCI is the maxCodeRate configured by the PUCCH resource configuration information corresponding to the first PUCCH, and if the PUCCH resource configuration information corresponding to the first PUCCH does not configure the maxCodeRate, determine the code rate for the first UCI according to the code rate for the second UCI.

Optionally, the base station further includes:

a fifth determination module, configured to:

determine that the code rate for the second UCI is the code rate for the first UCI plus a first adjustment factor, or the code rate for the first UCI minus the first adjustment factor, or the code rate for the first UCI multiplied by the first adjustment factor, or the code rate for the first UCI divided by the first adjustment factor;

or, determine that the code rate for the first UCI is the code rate for the second UCI plus a second adjustment factor, or the code rate for the second UCI minus the second adjustment factor, or the code rate for the second UCI multiplied by the second adjustment factor, or the code rate for the second UCI divided by the second adjustment factor.

Optionally, the first adjustment factor and/or the second adjustment factor is determined in one of following manners:

the first adjustment factor and/or the second adjustment factor is configured by a network through higher-layer signaling or is defined by a protocol;

or, the first adjustment factor and/or the second adjustment factor is determined from a set of numerical values according to a preset DCI, wherein the set of numerical values is configured by a network through higher-layer signaling or is defined by a protocol;

wherein, the adjustment factors are configured per-PUCCH format, or configured per-PUCCH resource.

Optionally, PUCCH resource configuration information corresponding to the third PUCCH configures a first maxCodeRate and/or a second maxCodeRate.

Optionally, the base station further includes:

a sixth determination module, configured to:

if the third PUCCH configuration is a PUCCH configuration configured for transmission of the first UCI and the second UCI, and the resource configuration information corresponding to the third PUCCH configures the first maxCodeRate and the second maxCodeRate, determine that the code rate for the first UCI is the first maxCodeRate and the code rate for the second UCI is the second maxCodeRate.

Optionally, the base station further includes:

a decoding module, configured to decode the first UCI and the second UCI according to the code rate for the first UCI and the code rate for the second UCI, respectively, when receiving the first UCI and the second UCI transmitted by the terminal in the third PUCCH.

It is noted, the apparatus in the embodiment corresponds to the method shown in FIG. 6, and the implementations in the foregoing embodiments are applicable to the embodiment of the apparatus, and can achieve the same technical effect. It is noted, the apparatus according the embodiment of the present disclosure can implement all method steps of the foregoing method embodiments, and can achieve the same technical effect, thus a detailed description of the part of the embodiment same as the method embodiments and beneficial effect thereof are omitted herein.

Figure 10:
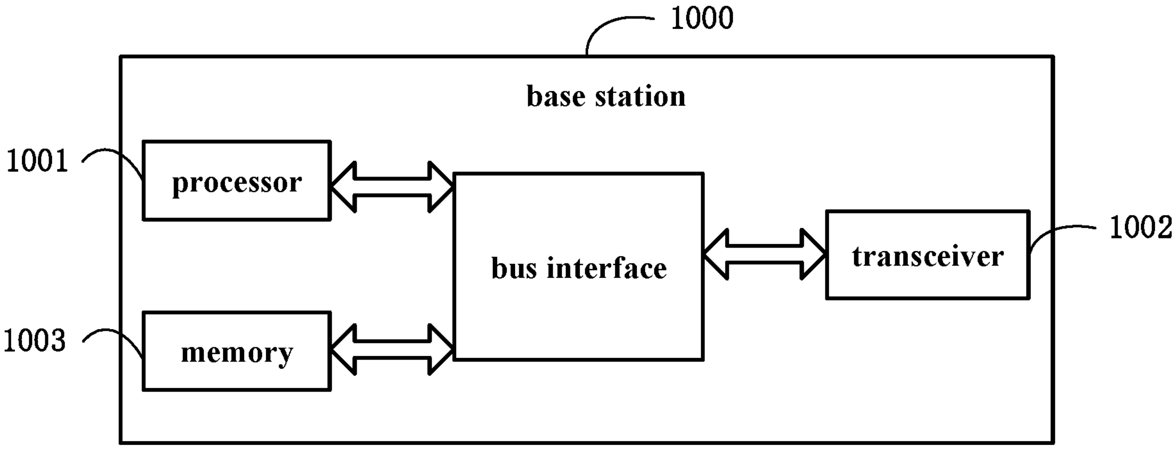
FIG. 10 is another schematic structural diagram of a base station according to an embodiment of the present disclosure.

Referring to FIG. 10, which is a schematic structural diagram of a base station 1000 according to an embodiment of the present disclosure, the base station 1000 includes: a processor 1001, a transceiver 1002, a memory 1003, and a bus interface.

In an embodiment of the present disclosure, the base station 1000 further includes a program stored in the memory 1003 and executable by the processor 1001. The processor 1001 is configured to execute the program to implement:

if a terminal determines or would transmit at least two PUCCHs which are overlapped, receiving a first UCI and a second UCI transmitted by the terminal in a third PUCCH, the at least two PUCCHs including a first PUCCH and a second PUCCH, the first PUCCH having a first priority index and carrying or corresponding to the first UCI, the second PUCCH having a second priority index and carrying or corresponding to the second UCI, wherein different code rates are used for the first UCI and the second UCI.

It may be understood, in embodiments of the present disclosure, when the computer program is executed by the processor 1001, various processes of the embodiment of the transmission method for PUCCH as shown in FIG. 6 can be implemented, and the same technical effects may be achieved. To avoid repetition, a detailed description is omitted herein.

In FIG. 10, a bus architecture may include any quantity of interconnected buses and bridges. Specifically, various circuits such as one or more processors represented by the processor 1001 and a memory represented by the memory 1003 are linked together. The bus architecture may also link various other circuits such as peripherals, voltage regulators, and power management circuits, which are well known in the art, and therefore are not further described herein. The bus interface provides an interface. The transceiver 1002 may include a plurality of elements, that is, a transmitter and a receiver, to provide units for communicating with various other apparatuses over a transmission medium.

The processor 1001 is responsible for managing the bus architecture and general processing. The memory 1003 can store data used by the processor 1001 while performing operations.

It is noted, the terminal in the embodiment is a device corresponding to the method shown in FIG. 6, and the implementations in the foregoing embodiments are applicable to the embodiment of the device, and can achieve the same technical effect. In the device, the transceiver 1002 and the memory 1003 may be communicatively connected via a bus interface, and the transceiver 1002 and the processor 1001 may be communicatively connected via the bus interface. The function of the processor 1001 may be implemented by the transceiver 1002, and the function of the transceiver 1002 may be implemented by the processor 1001. It is noted, the device according the embodiment of the present disclosure can implement all method steps of the foregoing method embodiments, and can achieve the same technical effect, thus a detailed description of the part of the embodiment same as the method embodiments and beneficial effect thereof are omitted herein.

In some embodiments of the present disclosure, a computer readable storage medium storing a program is further provided. The program is configured to be executed by a processor to implement the following step:

if a terminal determines or would transmit at least two PUCCHs which are overlapped, receiving a first UCI and a second UCI transmitted by the terminal in a third PUCCH, the at least two PUCCHs including a first PUCCH and a second PUCCH, the first PUCCH having a first priority index and carrying or corresponding to the first UCI, the second PUCCH having a second priority index and carrying or corresponding to the second UCI, wherein different code rates are used for the first UCI and the second UCI.

When the program is executed by the processor, various implementations of the transmission method for PUCCH applied to the base station can be implemented, and the same technical effects may be achieved. To avoid repetition, a detailed description is omitted herein.

A person skilled in the art may be aware that, the exemplary units and algorithm steps described in connection with the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, apparatus, and unit, reference may be made to a corresponding process in the foregoing method embodiments, and details are not described herein again.

In the several embodiments provided in the present application, it should be understood that the disclosed device and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in the embodiments of the disclosure. The foregoing storage medium includes any medium that can store program code, such as a universal serial bus (USB) flash drive, a removable hard disk, an ROM, an RAM, a magnetic disk, or an optical disc.

A person skilled in the art may understand that all or some of the processes of the method embodiments may be implemented by a computer program controlling relevant hardware. The computer program may be stored in a computer readable storage medium. When the computer program is executed, the processes of the method embodiments may be implemented. The storage medium may be a magnetic disk, optical disc, read-only memory (ROM) or random access memory (RAM), etc.

It may be understood that these embodiments described in this disclosure may be implemented by hardware, software, firmware, middleware, microcode or a combination thereof. For hardware implementation, a module, unit, sub-module, sub-unit may be implemented in one or more application specific integrated circuits (ASICs), a digital signal processor (DSP), a DSP device (DSPD), a programmable logic device (PLD), a field-programmable gate array (FPGA), a general-purpose processor, a controller, a microcontroller, a microprocessor, other electronic unit configured to perform the functions in the present disclosure or a combination thereof.

For a software implementation, the techniques in some embodiments of the present disclosure may be implemented by modules (for example, processes or functions) performing the functions described in some embodiments of the present disclosure. Software codes may be stored in a storage and executed by a processor. The storage may be implemented internal or external to a processor.

The aforementioned are merely specific implementations of the present disclosure, but the scope of the disclosure is by no means limited thereto. Any modifications or replacements that would easily occurred to those skilled in the art, without departing from the technical scope disclosed in the disclosure, should be encompassed in the scope of the present disclosure. Therefore, the scope of the present disclosure is to be determined by the scope of the claims.

What is claimed is:

1. A transmission method for physical uplink control channel (PUCCH), comprising:

if a terminal determines or would transmit at least two PUCCHs which are overlapped, the at least two PUCCHs comprising a first PUCCH and a second PUCCH, the first PUCCH having a first priority index and carrying or corresponding to a first uplink control information (UCI), the second PUCCH having a second priority index and carrying or corresponding to a second UCI, transmitting, by the terminal, the first UCI and the second UCI in a third PUCCH, wherein different code rates are used for the first UCI and the second UCI;

wherein, PUCCH resource configuration information corresponding to the third PUCCH configures a first maximum code rate and a second maximum code rate;

wherein, if the resource configuration information corresponding to the third PUCCH configures the first maximum code rate and the second maximum code rate, the method further comprises:

determining that the code rate for the first UCI is the first maximum code rate and the code rate for the second UCI is the second maximum code rate;

wherein the third PUCCH is one of at least one PUCCH resource configured by a third PUCCH configuration, and the PUCCH resource is configured by PUCCH resource configuration information, wherein, the third PUCCH configuration is a PUCCH configuration corresponding to the priority index of the second PUCCH.

2. The transmission method according to claim 1, wherein the transmitting, by the terminal, the first UCI and the second UCI in the third PUCCH comprises:

determining the third PUCCH according to a third downlink control information (DCI), wherein the third DCI is used for indicating transmission of the third PUCCH.

3. The transmission method according to claim 1, further comprising:

encoding the first UCI and the second UCI according to the code rate for the first UCI and the code rate for the second UCI, respectively, when transmitting the first UCI and the second UCI in the third PUCCH.

4. A transmission method for PUCCH, comprising:

if a terminal determines or would transmit at least two PUCCHs which are overlapped, receiving, by a base station, a first UCI and a second UCI transmitted by the terminal in a third PUCCH, the at least two PUCCHs comprising a first PUCCH and a second PUCCH, the first PUCCH having a first priority index and carrying or corresponding to the first UCI, the second PUCCH having a second priority index and carrying or corresponding to the second UCI, wherein different code rates are used for the first UCI and the second UCI;

wherein, PUCCH resource configuration information corresponding to the third PUCCH configures a first maximum code rate and/or a second maximum code rate;

wherein if the resource configuration information corresponding to the third PUCCH configures the first maximum code rate and the second maximum code rate, the method further comprises:

determining that the code rate for the first UCI is the first maximum code rate and the code rate for the second UCI is the second maximum code rate;

wherein the third PUCCH is one of at least one PUCCH resource configured by a third PUCCH configuration, and the PUCCH resource is configured by PUCCH resource configuration information, wherein, the third PUCCH configuration is a PUCCH configuration corresponding to the priority index of the second PUCCH.

5. The transmission method according to claim 4, wherein the receiving the first UCI and the second UCI transmitted by the terminal in the third PUCCH comprises:

determining the third PUCCH according to a third DCI, wherein the third DCI is used for indicating transmission of the third PUCCH.

6. A terminal, comprising a processor, a memory and a program stored in the memory and executable by the processor, wherein the processor is configured to execute the program, to implement a transmission method comprising:

if a terminal determines or would transmit at least two PUCCHs which are overlapped, the at least two PUCCHs comprising a first PUCCH and a second PUCCH, the first PUCCH having a first priority index and carrying or corresponding to a first uplink control information (UCI), the second PUCCH having a second priority index and carrying or corresponding to a second UCI, transmitting, by the terminal, the first UCI and the second UCI in a third PUCCH, wherein different code rates are used for the first UCI and the second UCI;

wherein, PUCCH resource configuration information corresponding to the third PUCCH configures a first maximum code rate and a second maximum code rate;

wherein, if the resource configuration information corresponding to the third PUCCH configures the first maximum code rate and the second maximum code rate, the method further comprises:

determining that the code rate for the first UCI is the first maximum code rate and the code rate for the second UCI is the second maximum code rate;

wherein the third PUCCH is one of at least one PUCCH resource configured by a third PUCCH configuration, and the PUCCH resource is configured by PUCCH resource configuration information, wherein, the third PUCCH configuration is a PUCCH configuration corresponding to the priority index of the second PUCCH.

7. A base station, comprising a processor, a memory and a program stored in the memory and executable by the processor, wherein the processor is configured to execute the program, to implement the steps of the transmission method for the PUCCH according to claim 4.

* * * * *